Patented June 19, 1945

2,378,812

UNITED STATES PATENT OFFICE 2,378,812

LEUCO - MONOACYL - 1,4-DIAMINOANTHRAQUINONE AND PROCESS FOR PREPARING THE SAME

William R. Waldron and Richard C. Franklin, Wilmington, Del., assignors to E. I. du Pont de Nemours & Company, Wilmington, Del., a corporation of Delaware No Drawing. Application August 1, 1942, Serial No. 453,268

11 Claims. (Cl. 260—377)

This invention relates to the preparation of stable leuco 1-amino-4-acylaminoanthraquinones.

In the preparation of 1-amino-4-acylaminoanthraquinones it has heretofore been the practice to acylate the 1,4-diaminoanthraquinone (in keto form) under controlled conditions. Various methods for controlling the monoacylation have been described in literature and in patents, but up to the present time no method has been found by which a substantially pure monoacyl-1,4-diaminoanthraquinone can be prepared from this intermediate except by involved and expensive purification of the acylated products. The 1-amino-4-acylaminoanthraquinones compose an important group of dye intermediates and their use has wide possibilities in the anthraquinone dye field, provided they can be prepared economically in pure form. Quinizarin or its leuco derivative is theoretically the ideal starting material for the preparation of this class of dye intermediates provided a satisfactory method can be devised for introducing only one acylamino group in the 1,4-diaminoanthraquinone, which latter compound is readily produced from quinizarin in high yields.

It is therefore an object of this invention to prepare 1-amino-4-acylaminoanthraquinone by a simple and economical process from the relative stable leuco 1,4-diaminoanthraquinone which in turn can be readily prepared from leuco quinizarin.

It is a further object of the invention to prepare new stable leuco 1-amino-4-acylaminoanthraquinones by a simple and economical process in relatively high yields and a high purity, which leuco compounds can be used directly for further condensations or which can be readily converted to the known 1-amino-4-acylaminoanthraquinones which are valuable dye intermediates.

It is known that leuco quinizarin is a relatively stable leuco compound that does not reoxidize to quinizarin as readily as many leuco derivatives of anthraquinone vat dyes and dye intermediates when exposed to air. It is also known that 1,4-diaminoanthraquinone can be converted to a relatively stable leuco derivative that also is resistant to air oxidation and is more stable than the isomeric leuco diaminoanthraquinones and is different from the ordinary product obtained in solution on vatting 1,4-diaminoanthraquinone. This relatively stable leuco 1,4-diaminoanthraquinone is readily prepared from leuco quinizarin by amination with ammonia or by other methods described in the literature.

We have found that this relatively stable leuco 1,4-diaminoanthraquinone, which can be prepared conveniently from leuco quinizarin by amination with ammonia, can be reacted with organic acid chlorides, and where there is no 1,4-diaminoanthraquinone present or formed in the reaction, only one of the amino groups in the molecule is acylated even though a large excess of the acid chloride is present. The resulting leuco monoacyl-diaminoanthraquinone is relatively stable to air oxidation and differs from the known unstable leuco derivatives in that it can be readily isolated and stored either in the paste or dry form for an extended period of time without undue oxidation.

According to our invention the relatively stable form of leuco 1,4-diaminoanthraquinone is suspended in an inert organic solvent such as nitrobenzene, chlorobenzene, etc., together with a quantity of an acid binding agent, such as sodium carbonate, potassium carbonates, pyridines, etc. The desired organic acyl chloride is then slowly added to the mass under agitation at a temperature such that there will be no oxidation of the leuco 1,4-diaminoanthraquinone to the keto form. The resulting product is isolated by filtering, followed by washing the filter cake with some of the same type of solvent employed in the reaction, then with alcohol, or the mass may be steam distilled to remove the organic solvent. When the reaction is carried out under conditions which preclude the oxidation of the leuco 1,4-diamino- or resulting leuco 1-amino-4-acylaminoanthraquinone the resulting product is a substantially pure monoacyl - diaminoanthraquinone which contains no appreciable quantities of the diacylamino derivative. The monoacylation takes place selectively even though a large excess of the acyl chloride is present in the reaction mass provided there is no 1,4-diaminoanthraquinone present in the starting material or formed during the reaction.

The following examples are given to illustrate the invention. The parts used are by weight.

Example 1

To a slurry of 10 parts of the stable form of leuco-1,4-diaminoanthraquinone and 10 parts of sodium carbonate in 50 parts of nitrobenzene are added under agitation, 8.7 parts of benzoyl chloride over a period of three hours while a temperature of about 50° C. is maintained. The mass is agitated at this temperature until all of the leuco - 1,4 - diaminoanthraquinone has reacted. The reaction mass is then cooled to 25° C., filtered and washed nitrobenzene-free with alcohol. The filter cake is reslurried in hot water, filtered, washed alkali-free with hot water and dried at 100° C. The resulting orange-brown product, which is a relatively stable leuco-1-amino-4-benzoylaminoanthraquinone gives a yellow coloration in 96% sulfuric acid, an orange coloration in pyridine and an orange coloration in glacial acetic acid. In alcohol it is moderately soluble with a red-orange solution. In sulfuric acid with boric acid it gives a yellow-brown solution while in sulfuric acid with p-formaldehyde it gives a yellow-green solution. It is insoluble in 10% caustic soda solution even at the boil. With a solution of sodium hydrosulfite and caustic soda at 70° C. it exists first as an orange-red precipitate which very slowly changes over the course of one-half hour to the red solution of the ordinary unstable solution of leuco-1-amino-4-benzoylaminoanthraquinone, as compared with the 1-amino-4-benzoylaminoanthraquinone which vats almost instantly when treated under similar conditions with caustic and hydrosulfite to a red solution.

The above product may be converted into 1-amino-4-benzoyl-aminoanthraquinone by heating 10 parts of the material in 50 parts of nitrobenzene for one hour at a temperature above 130–140° C. The resulting product is isolated by filtering, washing nitrobenzene-free with benzene and drying.

Example 2

To a slurry of 10 parts of leuco-1,4-diaminoanthraquinone in a solution of 50 parts of ortho-dichlorobenzene and 0.66 part of pyridine there is added a solution of 5.56 parts of benzoyl chloride in 10 parts of ortho-dichlorobenzene. The addition is carried out at a temperature of about 25° C. over a period of five to six hours. The resulting product is removed by filtering and washing the cake free of solvent with alcohol. The filter cake is reslurried in hot water, filtered, washed alkali-free and dried at 100° C. The product is leuco-1-amino-4-benzoylaminoanthraquinone, which may be converted into 1-amino-4-benzoylaminoanthraquinone as in Example 1.

Example 3

To a slurry of 10 parts of leuco-1,4-diaminoanthraquinone and 10 parts of sodium carbonate in 50 parts of nitrobenzene containing 0.027 part of pyridine are added approximately 10 parts of benzoyl chloride at about 50° C. over a period of three to four hours. The addition of benzoyl chloride is stopped when all of the leuco-1,4-diaminoanthraquinone has reacted. The reaction mixture is cooled to 25° C., filtered and steamed free of nitrobenzene. The steamed mixture is filtered, washed alkali-free with hot water and dried at 100° C. Partial oxidation of leuco-1-amino-4-benzoyl-aminoanthraquinone occurs during the steaming. The product may be completely converted to 1-amino-4-benzoylaminoanthraquinone by oxidation in nitrobenzene as described in Example 1.

Example 4

To a slurry of 10 parts of leuco-1,4-diaminoanthraquinone and 10 parts of disodium acid phosphate in 50 parts of nitrobenzene containing 0.40 part of pyridine under agitation are added 6.2 parts of benzoyl chloride over a period of about three hours at 50° C. The mixture is held on temperature three more hours, cooled to 25° C., filtered, and isolated as in Example 3.

Example 5

To a slurry of 10 parts of leuco-1,4-diaminoanthraquinone and 6.6 parts of sodium carbonate in 50 parts of nitrobenzene under agitation is added 14 parts of benzoyl chloride at 30–35° C. over a one-hour period. The mixture is allowed to stir at this temperature for 24 hours, after which the mixture is filtered and the product isolated as in Example 1.

Example 6

To a slurry of 10 parts of leuco-1,4-diaminoanthraquinone in 50 parts of nitrobenzene containing 6.6 parts of pyridine are added 4.0 parts of acetyl chloride over a period of two to three hours at 10–20° C. The product is then filtered and isolated as in Example 1.

Leuco-1-acetylamino-4-aminoanthaquinone is a reddish brown material showing a yellow coloration in strong sulfuric acid, a red-orange coloration in pyridine and an orange coloration in glacial acetic acid.

Oxidation of 10 parts of the above product by heating in 50 parts of nitrobenzene above 130–140° C. for one hour yields 1-acetylamino-4-aminoanthraquinone, which melts at 200 to 204° C. This product gives a brownish yellow coloration in strong sulfuric acid, a reddish purple coloration in pyridine, and a purple coloration in acetic acid. The vat of this material is scarlet.

Example 7

To a slurry of 10 parts of leuco-1,4-diaminoanthraquinone and 10 parts of sodium carbonate in 50 parts of nitrobenzene there is added under agitation a mixture of 9.8 parts of p-nitrobenzoyl chloride and 10 parts of nitrobenzene over a four-hour period at 50° C. The mixture is cooled to 25° C., the product filtered and isolated as in Example 1.

Leuco-1-amino-4 - (p-nitrobenzoylamino)-anthraquinone is a brown material giving a yellow coloration in strong sulfuric acid, a red-violet coloration in pyridine and an orange-red coloration in acetic acid.

Oxidation of this product as in Example 1 yields 1-amino-4-(p-nitrobenzoylamino)-anthraquinone, which melts at 294.5–296.5° C. The product gives a red-orange coloration in sulfuric acid, a purple coloration in pyridine and a purple coloration in acetic acid. The vat of this material is a brownish-orange.

Example 8

To a slurry of 10 parts of leuco-1,4-diaminoanthraquinone and 10 parts of sodium carbonate in 150 parts of nitrobenzene under agitation are added 13.1 parts of 1,9-isothiazole-anthrone-2-carbonyl chloride. The mixture is held at 25–35° C. for 48 hours, after which the product is filtered and isolated by steam distillation as in Example 3.

Example 9

To a slurry of 10 parts of leuco-1,4-diaminoanthraquinone and 10 parts of sodium carbonate in 100 parts of nitrobenzene under agitation at 40° C., are added 10.1 parts of p-methyl sulfonyl benzoyl chloride very slowly over a four-hour period. The mixture is cooled to 25° C., filtered and the leuco-1-amino-4-(p-methyl sulfonylbenzoylamino)-anthraquinone is isolated as in Example 1.

Oxidation of this product as described in Example 1 yields 1-amino-4-(p-methyl sulfonylbenzoylamino)-anthraquinone, which melts at 311.0–313.0° C.

*Example 10*

To a slurry of 50 parts of leuco-1,4-diaminoanthraquinone, and 250 parts of nitrobenzene and 50 parts of pyridine under agitation are added 43 parts of para-toluene sulphonyl chloride at room temperature. The reaction is heated slowly to 50–55° C., and held at this temperature until the disappearance of all of the leuco-1,4-diaminoanthraquinone. The product is isolated by making it strongly alkaline with sodium carbonate, steam distilling all of the solvent and filtering. The material obtained is a very dark colored compound.

As illustrated in the above examples a wide variety of organic acid chlorides may be condensed with the stable leuco-1,4-diaminoanthraquinone in the preparation of the stable leuco-1-acylamino-4-aminoanthraquinones in high yields and of high purity. The examples are given merely to illustrate the invention, it being understood that the invention is not limited to the particular acid chlorides mentioned for insofar as we have been able to determine the monoacylation of the stable leuco-1,4-diaminoanthraquinone takes place selectively, irrespective of the type of organic acid chloride employed provided the conditions are maintained whereby the leuco derivatives are not converted to the keto form in the presence of the acid chloride.

Nitrobenzene has been found to be the preferred solvent because of its particular solvent properties although other inert solvents such as ortho-nitrochlorbenzene, ortho-nitrotoluene, orthodichlorbenzene, etc. may be employed. When the nitrobenzene compounds are employed as the solvent, the resulting mono-acyl-diaminoanthraquinones can be readily converted to the keto form, after neutralization of any excess acid chloride, by merely heating to higher temperatures in the nitrobenzene solvent which itself functions as the oxidizing agent.

Other acid binding agents than the soda ash specifically employed in the above examples may be used such as disodium phosphate, pyridine, etc. We have found, however, that soda ash is the preferred acid binding agent in this reaction.

When nitrobenzene is employed the temperature of the acylation should not exceed from about 50–55° C. for at higher temperatures the leuco diaminoanthraquinone is oxidized to the keto compound which is readily diacylated under the conditions of the reaction to give the diacyl-diaminoanthraquinone which is an undesirable diluent in the final product for it will not react in those processes where the mono-acyl-diaminoanthraquinone is required as an intermediate in the preparation of dyestuffs. Where non-oxidizing solvents are employed higher temperatures can be used provided the higher temperatures do not accelerate oxidation in the mass due to the particular conditions otherwise employed.

It is important to employ as the starting material a leuco-1,4-diaminoanthraquinone which contains no 1,4-diaminoanthraquinone. Under the conditions of the reaction where as high as 50% excess of the organic acyl chloride is employed no diacylation of the leuco-1,4-diaminoanthraquinone is effected even where the reaction is carried out for an extended period of time. The acylchloride should be added to the reaction slowly to prevent the formation of too high a concentration of hydrochloric acid in the reaction at any one time, for hydrochloric acid tends to catalyze the oxidation of leuco-1,4-diaminoanthraquinone to the diaminoanthraquinone under the conditions otherwise employed. It is for the purpose of completely neutralizing the hydrochloric acid as it is formed in the reaction that the acid binding agent is employed in this reaction. The acid binding agent employed should be one which does not accelerate the decomposition of the benzoylchloride.

The leuco 1-acylamino-4-aminoanthraquinones constitute a new and important class of dye intermediates for as illustrated above they react different chemically from the 1-acylamino-4-aminoanthraquinone, being stable against diacylation. The 1-acylamino-4-aminoanthraquinones are therefore advantageously prepared by the acylation of the stable leuco-1,4-diaminoanthraquinone because no appreciable diacylation or other side reaction occurs even when a large excess of the acyl chloride is employed. The stable leuco-1-acylamino-4-aminoanthraquinones are therefore useful intermediates in the preparation of the 1-acylamino-4-aminoanthraquinones.

The stable leuco-1-amino-4-acylaminoanthraquinones may be converted directly to the keto form by heating in the nitrobenzene solution as previously described, or they may be isolated and oxidized with mild oxidizing agents. They may also be converted to the unstable leuco form by treatment with caustic alkali and an alkali metal hydrosulfite and then oxidized with air in the usual manner.

In the specification and claims the term "stable leuco" is employed to designate the stable reduction product or leuco compound of 1,4-diaminoanthraquinone and the stable reduction product or leuco compound of 1-amino-4-acylaminoanthraquinones that are relatively stable to air oxidation as distinguished from those compounds resulting from vatting the corresponding keto derivatives which latter vatted compounds are unstable in air, oxidizing immediately to the keto form.

We claim:

1. The process which comprises reacting the stable leuco-1,4-diaminoanthraquinone with organic acid halides under conditions which preclude the oxidation of the leuco-1,4-diaminoanthraquinone and the leuco-1-amino-4-acylaminoanthraquinone which is produced to the keto form.

2. The process which comprises reacting the stable leuco-1,4-diaminoanthraquinone with benzoylchloride under conditions which preclude the oxidation of the leuco-1,4-diaminoanthraquinone and the leuco-1-amino-4-benzoylaminoanthraquinone which is produced, to the keto form.

3. The process for preparing a stable leuco-1-amino-4-acylaminoanthraquinone which comprises reacting the stable leuco-1,4-diaminoanthraquinone in an inert organic solvent with an organic acid chloride in the presence of an acid binding agent and under conditions which preclude oxidation of the leuco compounds.

4. The process for preparing a stable leuco-1-amino-4-benzoylaminoanthraquinone which comprises reacting the stable leuco-1,4-diaminoanthraquinone in an inert organic solvent with benzoylchloride in the presence of an acid binding agent and under conditions which preclude oxidation of the leuco compounds.

5. The process for preparing a stable leuco-1-amino-4-acylaminoanthraquinone which comprises reacting the stable leuco-1,4-diaminoanthraquinone with an acylchloride in an inert organic solvent and in the presence of an acid binding agent at temperatures not above 55° C., the acylchloride being added slowly to prevent the formation of undue amounts of hydrochloric acid in the reaction mass at any one time.

6. The process for preparing a stable leuco-1-amino-4-benzoylaminoanthraquinone which comprises reacting the stable leuco-1,4-diaminoanthraquinone with benzoyl chloride in an inert organic solvent and in the presence of an acid binding agent at temperatures not above 55° C., the benzoyl chloride being added slowly to prevent the formation of undue amounts of hydrochloric acid in the reaction mass at any one time.

7. The process for preparing a stable leuco-1-amino-4-benzoylaminoanthraquinone which comprises reacting the stable leuco-1,4-diaminoanthraquinone with benzoyl chloride in nitrobenzene and in the presence of sodium carbonate at temperatures not above 55° C., the benzoyl chloride being added slowly to prevent the formation of undue amounts of hydrochloric acid in the reaction mass at any one time.

8. The process for preparing 1-amino-4-acylamino-anthraquinone which comprises reacting the stable leuco-1,4-diamino-anthraquinone with acyl chloride under conditions which preclude the oxidation of the leuco 1,4-diaminoanthraquinone or the leuco-1-amino-4-acylaminoanthraquinone to the keto form and after rendering ineffectual any excess acid halide that may be employed in the reaction, oxidizing the leuco-1-amino-4-acylaminoanthraquinone to the 1-amino-4-acylaminoanthraquinone.

9. The process for preparing 1-amino-4-benzoylamino-anthraquinone which comprises reacting the stable leuco-1,4-diaminoanthraquinone with benzoyl chloride under conditions which preclude the oxidation of the leuco-1,4-diaminoanthraquinone or the leuco-1-amino-4-benzoylaminoanthraquinone to the keto form and after rendering ineffectual any excess benzoyl chloride that may be employed in the reaction, oxidizing the leuco-1-amino-4-benzoylaminoanthraquinone to the 1-amino-4-benzoylaminoanthraquinone.

10. The stable leuco-1-amino-4-acylaminoanthraquinones which are obtained by the process of claim 5.

11. The stable leuco-1-amino-4-benzoylaminoanthraquinone which is obtained by the process of claim 6.

WILLIAM R. WALDRON.
RICHARD C. FRANKLIN.